United States Patent
Lu et al.

(10) Patent No.: US 8,520,626 B2
(45) Date of Patent: Aug. 27, 2013

(54) METHOD FOR TRANSMITTING NON-USER-SPECIFIC CONTROL INFORMATION IN A WIRELESS COMMUNICATION SYSTEM

(75) Inventors: Zhaohua Lu, Shenzhen (CN); Yanfeng Guan, Shenzhen (CN); Ying Liu, Shenzhen (CN); Huiying Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 225 days.

(21) Appl. No.: 13/054,939

(22) PCT Filed: Aug. 18, 2009

(86) PCT No.: PCT/CN2009/073326
§ 371 (c)(1),
(2), (4) Date: Feb. 18, 2011

(87) PCT Pub. No.: WO2010/048832
PCT Pub. Date: May 6, 2010

(65) Prior Publication Data
US 2011/0158152 A1 Jun. 30, 2011

(30) Foreign Application Priority Data
Oct. 31, 2008 (CN) .......................... 2008 1 0225460

(51) Int. Cl.
*H04W 4/00* (2009.01)
(52) U.S. Cl.
USPC .......................................... 370/330; 370/471

(58) Field of Classification Search
USPC ................. 370/431, 436, 442, 458, 319, 321, 370/322, 326, 337, 347, 348, 349, 330, 471
See application file for complete search history.

(56) References Cited

U.S. PATENT DOCUMENTS

| | | | |
|---|---|---|---|
| 2007/0177683 A1 | 8/2007 | Matsushita | |
| 2008/0220791 A1 | 9/2008 | Cho et al. | |
| 2009/0232062 A1* | 9/2009 | Higuchi et al. | 370/329 |
| 2012/0113947 A1* | 5/2012 | Kim et al. | 370/329 |

FOREIGN PATENT DOCUMENTS

| | | |
|---|---|---|
| CN | 1951045 A | 4/2007 |
| CN | 101282295 A | 10/2008 |
| JP | 2008193648 A | 8/2008 |
| WO | 2007148610 A1 | 12/2007 |
| WO | 2008123024 A1 | 10/2008 |

OTHER PUBLICATIONS

Coding Scheme of L1/L2 Control Channel for E-UTRA Downlink Jun. 27-30, 2006.

(Continued)

*Primary Examiner* — Brenda H Pham
(74) *Attorney, Agent, or Firm* — Oppedahl Patent Law Firm LLC

(57) ABSTRACT

A method for transmitting non-user-specific control information in a wireless communication system includes: in a downlink time period which includes one or more time zones, a base station sends non-user-specific control information in a time zone in which user specific control information is sent; and a terminal obtains and decodes the non-user-specific control information, then obtains information needed to decode user specific control information according to the obtained non-user-specific control information.

22 Claims, 4 Drawing Sheets

(56) References Cited

OTHER PUBLICATIONS

E-UTRA Downlink Control Signaling—Open Issues May 8-12, 2006.
Proposed Baseline Content on the Downlink Control Structure May 12, 2008.
International Search Report in international application No. PCT/CN2009/073326, mailed on Dec. 3, 2009.
English Translation of the Written Opinion of the International Search Authority in international application No. PCT/CN2009/073326, mailed on Dec. 3, 2009.

* cited by examiner (a)

(b)

(c)

(a)

(b)

(c)

METHOD FOR TRANSMITTING NON-USER-SPECIFIC CONTROL INFORMATION IN A WIRELESS COMMUNICATION SYSTEM

TECHNICAL FIELD

The present disclosure relates to an information transmission technology in wireless communication, and particularly to a method for transmitting non-user-specific control information in a wireless communication system.

BACKGROUND

A wireless communication system mainly comprises network entities such as a mobile terminal (terminal for short), a base station, a wireless network controller, a core network, etc.; wherein the base station refers to an equipment providing services to the terminal and communicating with the terminal through an uplink and a downlink; the downlink (or called forward) refers to a direction from the base station to the terminal and the uplink (or called reverse) refers to a direction from the terminal to the base station. A plurality of terminals can send data to the base station through the uplink simultaneously or receive data from the base station through the downlink simultaneously.

In a wireless data transmission system where scheduling and control is conducted by the base station, the scheduling and allocation of system resources are usually conducted by the base station, for example, the base station needs to schedule and control resource allocation when the base station is performing downlink transmission, and schedule and control resources available for uplink transmission of the terminal.

With the continuous development of the wireless communication technology, orthogonal frequency division multiplex (OFDM) technology is introduced into the wireless communication system. In an IEEE 802.16m time division duplex (TDD) wireless communication system adopting an OFDM access (OFDMA) technology, the composition of frame structure of IEEE 802.16m is as shown in FIG. 1: the entire wireless resource is divided into granularities with different structures including super frames, frames, subframes (SF) and OFDM symbols. Specifically, the wireless resource can be divided into time-continuous super frames first, each of which has a time length of 20 ms and a header. Each super frame is composed of four frames each of which has a length of 5 ms and each of which includes eight subframes SF0~SF7, and each subframe is composed of six OFDM symbols.

In the IEEE 802.16m TDD wireless communication system, non-user-specific control information, i.e. information unspecific for a certain user or user group, is transmitted in downlink transmission. Generally, non-user-specific control information includes information needed to decode user specific control information. At present, there has not been a specific solution for reasonably helping a user decode the user specific control information by transmitting the non-user-specific control information to the user.

SUMMARY

In view of this, the present disclosure mainly aims to provide a method for transmitting non-user-specific control information in a wireless communication system, so as to help a user decode user specific control information and consequently improve the performance of the entire wireless communication system.

In order to achieve the above purpose, the technical scheme of the disclosure is realized as such:

The disclosure provides a method for transmitting non-user-specific control information in a wireless communication system, which comprises:

in a downlink time period which includes one or more time zones, a base station sends non-user-specific control information in a time zone in which user specific control information is sent; a terminal obtains and decodes the non-user-specific control information, and then obtains information needed to decode user specific control information according to the obtained non-user-specific control information.

In the above technical scheme, the downlink time period may be a downlink time period between an uplink-to-downlink transition switch-point and an adjacent downlink-to-uplink switch-point.

In the above technical scheme, one time zone may be a subframe.

In the above technical scheme, the non-user-specific control information may include: time-frequency resource allocation used for the user specific control information, and/or modulation coding mode used for user specific control information.

In the above technical scheme, the non-user-specific control information may be sent by segment, so that each non-user-specific control information segment includes information needed to decode a piece of user specific control information, wherein the non-user-specific control information segment may include: time-frequency resource allocation used by the base station for sending user specific control information, and/or modulation coding mode used by the base station for sending user specific control information, and/or a flag indicating whether other non-user-specific control information segment is sent in the current time zone.

In the above technical scheme, the base station may send resource allocation information of the non-user-specific control information in the time zone in which the non-user-specific control information is sent; correspondingly, according to the resource allocation information of the non-user-specific control information, the terminal may obtain time-frequency resource allocation used for sending the non-user-specific control information, and then may decode and obtain the non-user-specific control information in the obtained time-frequency resource allocation.

The disclosure further provides a method for transmitting non-user-specific control information in a wireless communication system, which comprises:

in a downlink time period which includes one or more time zones, a base station sends non-user-specific control information in a first time zone in which user specific control information is sent; a terminal obtains and decodes the non-user-specific control information, and then obtains information needed to decode user specific control information according to the obtained non-user-specific control information; wherein the downlink time period may be a downlink time period between an uplink-to-downlink switch-point and an adjacent downlink-to-uplink switch-point.

In the above technical scheme, one time zone may be a subframe, and the first time zone may be a first subframe.

In the above technical scheme, the non-user-specific control information may include: time-frequency resource allocation used for user specific control information, and/or modulation coding mode used for user specific control information, and/or information describing whether there is user specific control information in each time zone of the downlink time period.

In the above technical scheme, when there is user specific control information in some of the time zones of the downlink time period, the non-user-specific control information may further include information indicating time interval at which user specific control information appears, and the time interval may adopt one or more time zones as a unit.

In the above technical scheme, the non-user-specific control information may be sent by segment, so that each non-user-specific control information segment includes information needed to decode a piece of user specific control information;

wherein time-frequency resource allocation of a first non-user-specific control information segment may be known to the terminal, and time-frequency resource allocation of other non-user-specific control information segments may be obtained by the terminal through calculation;

wherein the non-user-specific control information segment may include: time-frequency resource allocation used by the base station for sending user specific control information, and/or modulation coding mode used by the base station for sending user specific control information, and/or a flag indicating whether other non-user-specific control information segment is sent in the current time zone;

wherein the first non-user-specific control information segment may further include: information indicating time interval at which user specific control information appears in time zones of the downlink time period; and time interval indicating information may be carried explicitly or implicitly.

In the above technical scheme, the base station may send resource allocation information of the non-user-specific control information in the first time zone in which the non-user-specific control information is sent; correspondingly, according to the resource allocation information of the non-user-specific control information, the terminal may obtain time-frequency resource allocation used for sending the non-user-specific control information, and then may decode and obtain the non-user-specific control information in the obtained time-frequency resource allocation.

In the above technical scheme, the base station may send the non-user-specific control information through broadcasting, multicasting or unicasting.

The method for transmitting non-user-specific control information in a wireless communication system in the present disclosure, includes: in a downlink time period which includes one or more time zones, a base station sends non-user-specific control information to a terminal in a time zone in which user specific control information is sent, so that the terminal can obtain information needed to decode user specific control information. Further, in a downlink time period which includes one or more time zones, the base station sends the non-user-specific control information in a first time zone in which the user specific control information is sent. In this manner, by sending the non-user-specific control information to a user in a reasonable location, the base station can not only help the user decode user specific control information, but also improve the performance of the entire wireless communication system.

In the present disclosure, the non-user-specific control information may be sent by broadcasting, multicasting or unicasting; partial or complete information needed to decode user specific control information may be sent according to practical condition; according to need, the non-user-specific control information may include time-frequency resource allocation used, modulation coding mode used, information indicating whether user specific control information is sent in each time zone of the downlink time period, and time interval at which user specific control information appear in time zones. In a word, the disclosure is flexible and variable in specific realization, is easy to realize, can be suitable for various situations and environments, and can be used in a wide range.

DETAILED DESCRIPTION

The basic thought of the disclosure is: in a downlink time period which includes one or more time zones, a base station sends non-user-specific control information to a terminal in a time zone in which user specific control information is sent, so that the terminal can obtain and decode the non-user-specific control information, and then can obtain information needed to decode user specific control information according to the obtained non-user-specific control information.

The disclosure can be suitable for a TDD system or an FDD system.

Figure 1:
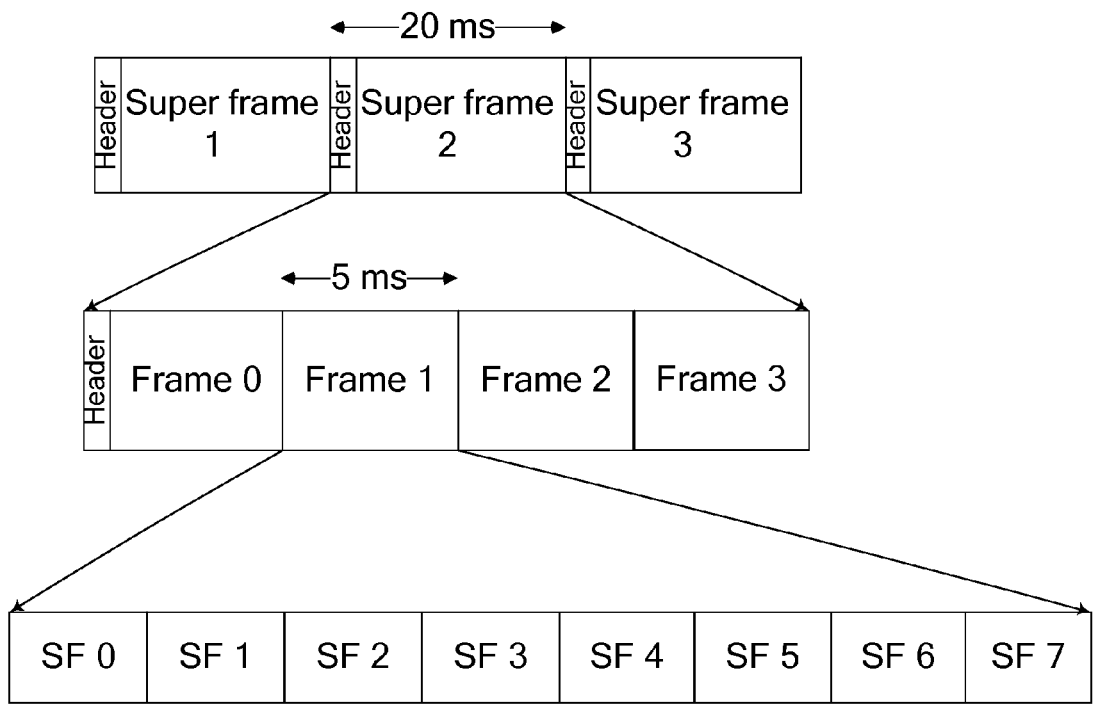
FIG. 1 is a schematic view of frame structure in an IEEE 802.16m wireless communication system.
Figure 2:
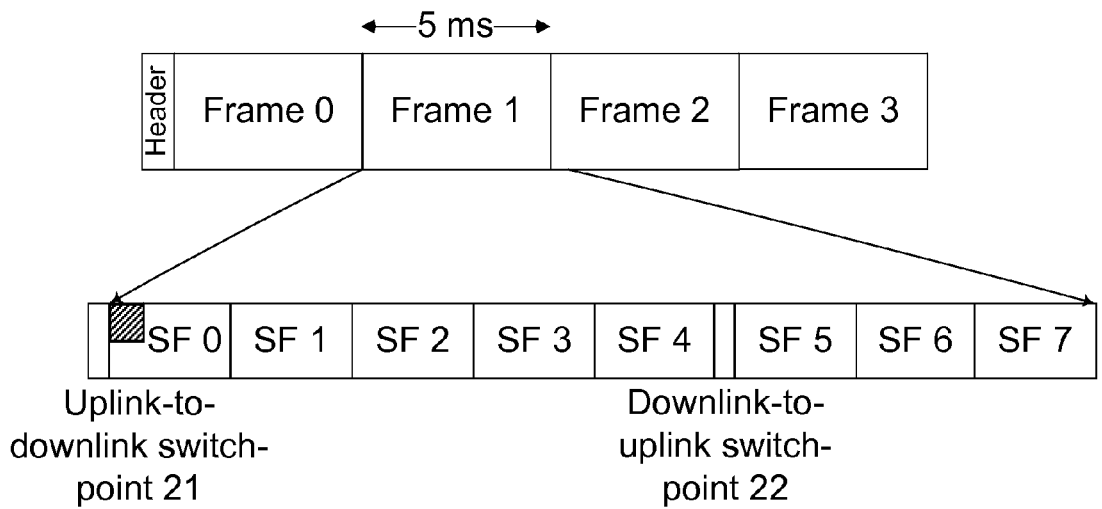
FIG. 2 is a schematic view of frame structure for transmitting non-user-specific control information by a base station in a TDD mode.

Further, for the TDD system, the base station may send the non-user-specific control information in a first time zone of the downlink time period which includes one or more time zones, and the user specific control information is also sent in the first time zone.

Wherein the time period is composed of a plurality of time zones (1 . . . N) with the same or different length, and can be a downlink time period between an uplink-to-downlink switch-point and an adjacent downlink-to-uplink switch-point. For example, as shown in FIG. 2, the time period between the uplink-to-downlink switch-point 21 and the downlink-to-uplink switch-point 22 forms a downlink time period between the adjacent uplink/downlink switch-points, and includes five subframes from SF 0 to SF 4. Each subframe is one time zone, the first subframe SF 0 is the first time zone, and the like; the part filled with oblique lines at the upper left corner of SF 0 means that the first subframe includes the user specific control information.

For the TDD system, it is prescribed that a first subframe should include user specific control information according to standard, and correspondingly, in the present disclosure, the base station sends the non-user-specific control information in the first time zone, i.e. the first subframe; besides the first time zone of the downlink time period between the adjacent uplink/downlink switch-points, the base station can also send the non-user-specific control information in any time zone in which user specific control information is sent. Preferably, the base station sends the non-user-specific control information in the first time zone.

In the present disclosure, the base station can send the non-user-specific control information through broadcasting, multicasting or unicasting. The non-user-specific control information sent by the base station includes partial or complete information needed to decode the user specific control information in the current time zone; here, the needed information includes: the time-frequency resource allocation used for the user specific control information, and/or modulation coding mode used for the user specific control information, and/or information describing whether there is user specific control information in each time zone of the current downlink time period. If the base station sends all the information needed to decode the user specific control information, the base station sends all the needed information; if some information is known to the terminal, for example, the time-frequency resource allocation used for the user specific control information and the modulation coding mode used for the user specific control information are invariable and known to the terminal, it is not necessary for the base station to occupy resource to send them again, and then the base station only sends partial needed information.

The non-user-specific control information sent by the base station further includes information indicating time interval at which the user specific control information appears in time zones of the downlink time period; for example, a field is set to indicate the time interval at which the user specific control information appears in time zones of the downlink time period. The field may be a numerical value, and different values represent different meanings. For example, when the value is 1, it indicates that user specific control information is sent in each time zone; when the value is 2, it indicates that user specific control information is sent in every other time zone, i.e. user specific control information is sent in the first time zone, user specific control information is sent in the (1+2)th time zone, . . . , and the like. Of course, the specific value and the corresponding meaning of the field can be defined as the user wishes.

When the base station sends the non-user-specific control information, the time-frequency resource allocation used for the non-user-specific control information may be invariable and is known to the terminal. In this case, the base station does not need to send the resource allocation information of the non-user-specific control information when sending the non-user-specific control information. In reverse, if the time-frequency resource allocation used for the non-user-specific control information is not invariable, the base station needs to send the resource allocation information of the non-user-specific control information in the time zone in which the non-user-specific control information is sent.

When sending the non-user-specific control information, the base station can send all the non-user-specific control information together or divide the non-user-specific control information into non-user-specific control information segments in a number of M. Generally, the modulation coding mode used by the base station for sending the non-user-specific control information is invariable and the modulation coding mode used by the base station for sending the user specific control information is variable, therefore, when the modulation coding modes used for the user specific control information are different, the non-user-specific control information needs to be sent by segment.

When the base station divides the non-user-specific control information into a plurality of segments, each non-user-specific control information segment may include: information needed to decode a piece of user specific control information, and/or information describing time-frequency resource allocation used by the base station for sending a piece of user specific control information, and/or information describing the modulation coding mode used by the base station for sending a piece of user specific control information. Each non-user-specific control information segment may also include a flag indicating whether there is subsequent non-user-specific control information segment in the current time zone. For example, a value is set for the flag, when the value is 1, it indicates that there is subsequent non-user-specific control information segment in the time zone, and when the value is 0, it indicates that there is no subsequent non-user-specific control information segment in the time zone. Of course, the specific value and the meaning of the flag can be defined as the user wishes.

When the base station sends a first non-user-specific control information segment, time-frequency resource allocation used for the first non-user-specific control information segment is invariable and is known to the terminal, and that used for other non-user-specific control information segments can be obtained by the terminal through calculation. Besides, a value can be included in the first non-user-specific control information segment explicitly, to indicate time interval at which the user specific control information appears in time zones of the current downlink time period; or a value can be included in the first non-user-specific control information segment implicitly, to indicate the time interval at which the user specific control information appears in time zones of the downlink time period. The implicit inclusion means that mathematical operation, XOR operation for example, is performed between the indicating value and a cyclic redundancy check bit sequence generated by the base station from the content of the first non-user-specific control information segment, the base station sends a operated sequence to the terminal subsequently, and the terminal calculates the indicating value through the known mathematical operation after receiving the operated sequence. This is equivalent to including the indicating value in the cyclic redundancy check bit sequence implicitly, therefore, the transmission is not influenced, and it is not required to occupy separate resource to send the indicating value.

When the base station sends the non-user-specific control information segment, the modulation coding mode used for the non-user-specific control information segment may be invariable and is known to the terminal; the size of the time-frequency resource used for the non-user-specific control information segment may also be invariable and is known to the terminal.

Figure 3:
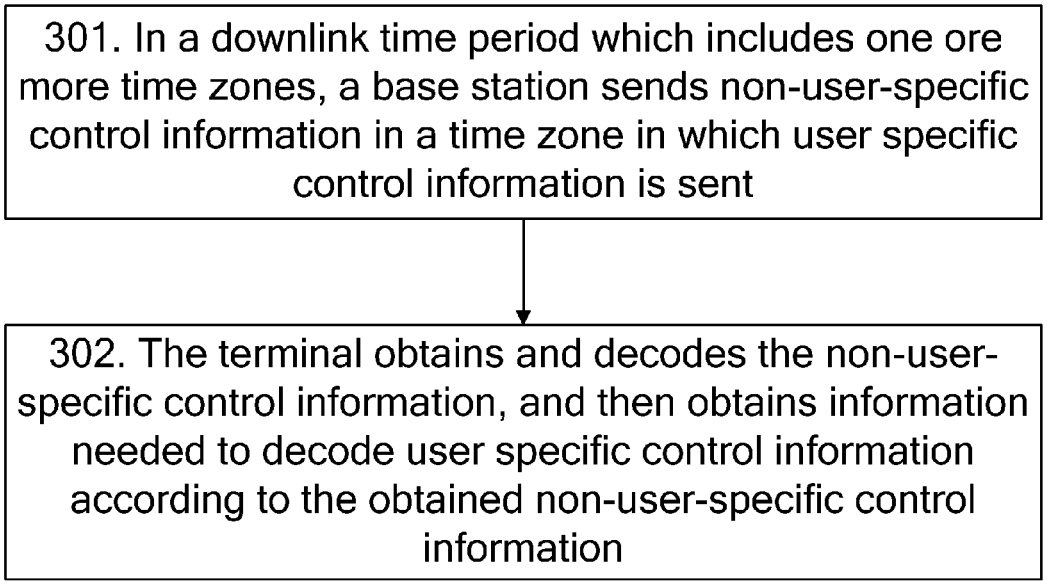
FIG. 3 is a flowchart illustrating transmission of non-user-specific control information by a base station in a TDD mode.

As shown in FIG. 3, the method for transmitting non-user-specific control information in the present invention comprises the following steps:

step 301: in a downlink time period which includes one or more time zones, a base station sends non-user-specific control information to a terminal in a time zone in which user specific control information is sent;

for a TDD system, the base station can send the non-user-specific control information in a first time zone of the downlink time period which includes one or more time zones, and the user specific control information is also sent in the first time zone. The downlink time period may be a downlink time period between an uplink-to-downlink switch-point and an adjacent downlink-to-uplink switch-point;

step 302: the terminal obtains and decodes corresponding non-user-specific control information, and then obtains information needed to decode user specific control information according to the obtained non-user-specific control information.

Here, the base station may send information describing time-frequency resource allocation, which is used for transmitting partial or complete non-user-specific control information, in time-frequency resource known to the terminal; the terminal obtains the information describing the time-frequency resource allocation, which is used by the base station for sending partial or complete non-user-specific control information, in the known time-frequency resource, and then obtains partial or complete non-user-specific control information in the obtained time-frequency resource allocation; or the terminal directly obtains partial or complete non-user-specific control information in the known time-frequency resource allocation.

Generally, the terminal can decode the obtained non-user-specific control information by using known information and then obtain partial or complete information needed to decode the user specific control information. Here, the known information refers to information such as modulation coding mode, etc.

The terminal can analyze the non-user-specific control information sent by the base station, and obtain information indicating whether there is user specific control information in each time zone of the current downlink time period, and obtain time interval at which the user specific control information appears in time zones. For example, if the value of the obtained time interval is 1, the terminal knows that user specific control information is sent in each time zone of the current downlink time period; if the value of the obtained time interval is 2, the terminal knows that user specific control information is sent in every other time zone of the current downlink time period.

The terminal can also obtain content of a first non-user-specific control information segment in the known time-frequency resource allocation. Further, the terminal attempts to decode user specific control information corresponding to the first non-user-specific control information segment through the content of the first non-user-specific control information segment.

The terminal can obtain information indicating whether there is user specific control information in each time zone of the downlink time period by analyzing a field which is included in the first non-user-specific control information segment and is used to indicate time interval at which user specific control information appears in time zones of the downlink time period.

Through mathematical operation, XOR operation for example, to a cyclic redundancy check bit sequence generated by the content of the first non-user-specific control information segment, the terminal can also obtain a value, which is implicitly included in the cyclic redundancy check bit sequence, for indicating time interval at which user specific control information appears in time zones of the current downlink time period, and then obtain information indicating whether there is user specific control information in each time zone of the current downlink time period.

The terminal can know whether there is subsequent non-user-specific control information segment in the current time zone by analyzing a flag in each non-user-specific control information segment indicating whether there is subsequent non-user-specific control information segment. For example, when the value of the flag is 1, the terminal knows there is subsequent non-user-specific control information segment in the current time zone; when the value of the flag is 0, the terminal knows there is no subsequent non-user-specific control information segment in the current time zone. When confirming that there is subsequent non-user-specific control information segment in the current time zone, the terminal can calculate time-frequency resource allocation used to send the next non-user-specific control information segment through time-frequency resource allocation of user specific control information, which is described in corresponding non-user-specific control information segment and corresponding to it. For example, the time-frequency resource allocation for the next non-user-specific control information segment can be calculated according to the time-frequency resource allocation of the current non-user-specific control information segment, the size of the time-frequency resource of the current non-user-specific control information segment, and the allocation and the size of the time-frequency resource of the user specific control information corresponding to the current non-user-specific control information segment.

In the present disclosure, the base station sends the non-user-specific control information in the time zone in which the user specific control information is sent. In practical application, the base station can also send the user specific control information and the non-user-specific control information in different time zones, as long as the non-user-specific control information is sent prior to the user specific control information to be decoded.

The realization process of the transmitting method of the disclosure will be described in detail hereinafter, in combination with the attached figures and specified embodiments. Wherein the embodiments adopt a frame structure of IEEE 802.16m with the ratio of downlink to uplink being 5:3, as shown in FIG. 2. The uplink-to-downlink switch-point is before the first subframe SF 0, and the downlink-to-uplink switch-point is before the sixth subframe SF 5, and the downlink time period is composed of five subframes from SF 0 to SF 4. In embodiment 1 to embodiment 3, the non-user-specific control information is sent in the first time zone, i.e. the first subframe. In embodiment 4 to embodiment 6, the non-user-specific control information is sent in the third time zone, i.e. the third subframe.

Embodiment 1

In this embodiment, the first subframe SF 0 includes the user specific control information, all the non-user-specific control information is sent together, the time-frequency resource allocation and the modulation coding mode which are used to send the non-user-specific control information are invariable and known to the terminal.

Figure 4:
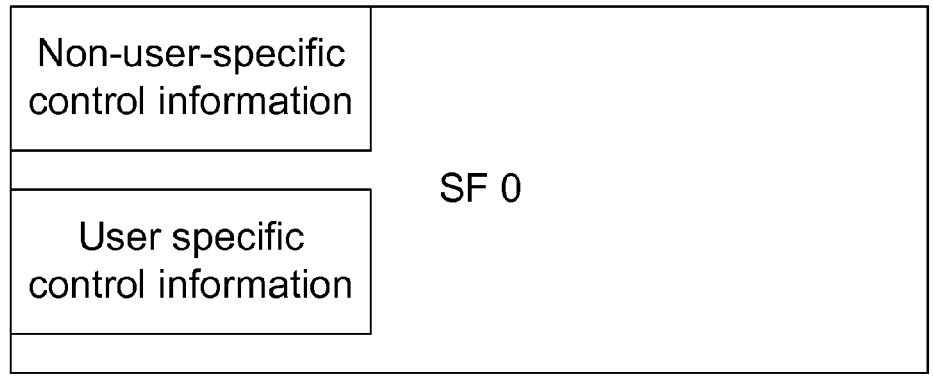
FIGS. 4(a)~(c) are schematic views of subframe structure for transmitting non-user-specific control information by a base station in a TDD mode.
Figure 4:
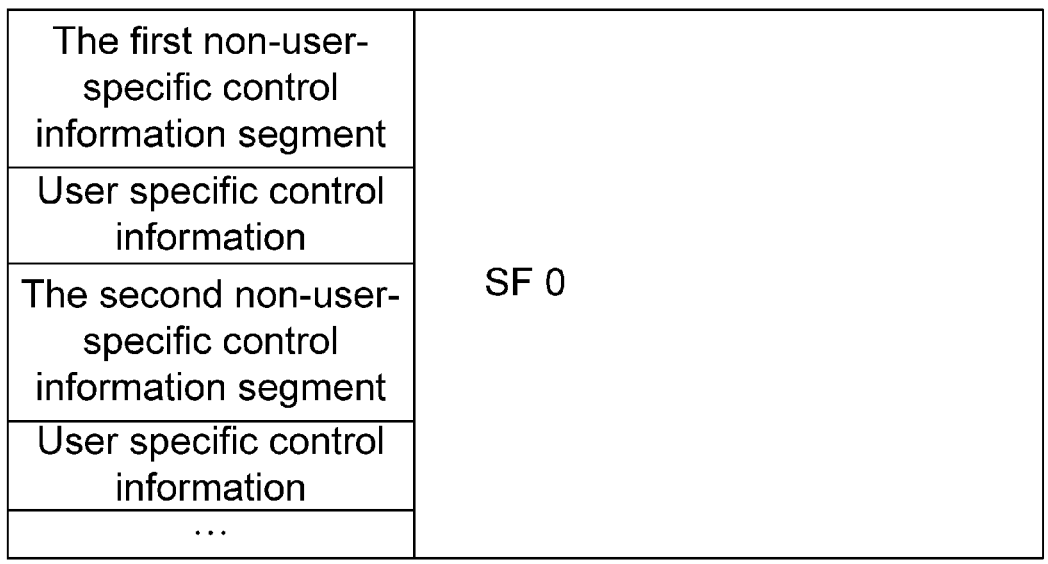
Figure 4:
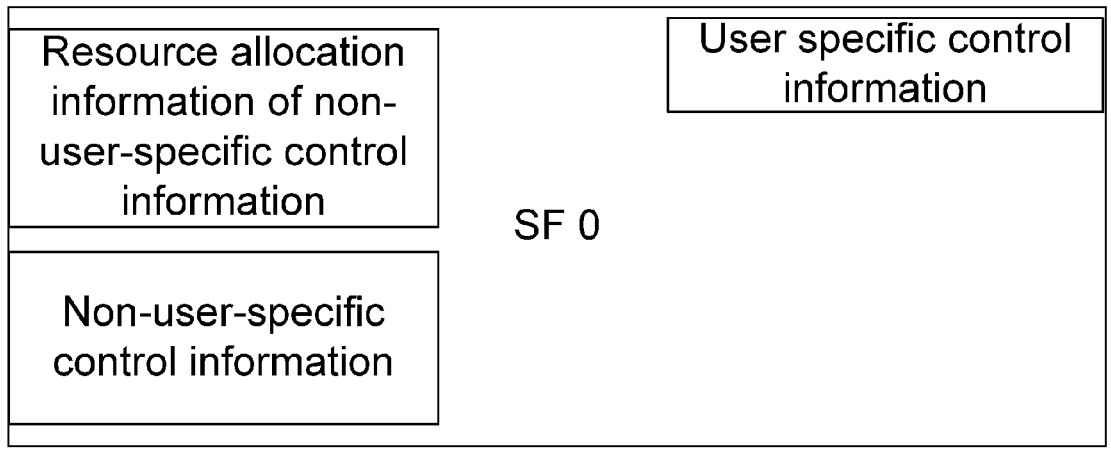

As shown in FIG. 4(*a*), in SF 0, the base station sends the non-user-specific control information in the time-frequency resource allocation of the first subframe known to the terminal according to the modulation coding mode known to the terminal, the sent non-user-specific control information includes content such as: the time-frequency resource allocation used by the base station for sending the user specific control information, the modulation coding mode used by the base station for sending the user specific control information, and the field describing whether the base station sends the user specific control information in each subframe of the current downlink period; wherein when the value of the field is 1, it indicates that the user specific control information appears in every other subframe.

The terminal decodes and obtains the non-user-specific control information in the known time-frequency resource allocation through corresponding modulation coding mode, thereby obtaining content such as: the downlink time-frequency resource allocation of each piece of user specific control information, the modulation coding mode used by the base station for sending each piece of user specific control information, and information indicating whether the base station sends the user specific control information in each subframe of the downlink time period.

Here, the non-user-specific control information sent by the base station to the terminal can be described in the forms in Table 1 or Table 2.

TABLE 1

| Name of Field | Description |
|---|---|
| Length | Describing effective length of non-user-specific control information |
| Subframe Interval Indicator | Indicating the time interval at which user specific control information appears in time zones of the downlink time period; when the value is 0, it indicates that every subframe includes user specific control information, and when the value is 1, it indicates that every other subframe includes user specific control information, and the like. |
| N | Describing the number of pieces of the user specific control information |
| Resource Allocation 1 | Time-frequency resource allocation used by the base station for sending the first piece of user specific control information |
| Transmission Format 1 | Modulation coding mode used by the base station for sending the first piece of user specific control information |
| . . . | |
| Resource Allocation N | Time-frequency resource allocation used by the base station for sending the Nth piece of user specific control information |
| Transmission Format N | Modulation coding mode used by the base station for sending the Nth piece of user specific control information |

TABLE 2

| Name of Field | Description |
|---|---|
| Length | Describing effective length of non-user-specific control information |
| Subframe Interval Indicator | Indicating the time interval at which user specific control information appears in time zones of the downlink time period; when the value is 1, it indicates that every subframe includes user specific control information, and when the value is 2, it indicates that every other subframe includes user specific control information, and the like. |
| Resource Allocation | Time-frequency resource allocation used by the base station for sending user specific control information |
| Transmission Format | Modulation coding mode used by the base station for sending user specific control information |
| USCCH Exist Flag | Indicating whether there is content describing other user specific control information subsequently; when the value is 1, it indicates that there is content describing other user specific control information subsequently, and when the value is 0, it indicates that there is no content describing other user specific control information subsequently. |
| If the value of USCCH exist flag is 1, there are the following three fields: | |
| Resource Allocation | Time-frequency resource allocation used by the base station for sending user specific control information |
| Transmission Format | Modulation coding mode used by the base station for sending user specific control information |
| USCCH Exist Flag | Indicating whether there is content describing other user specific control information subsequently; when the value is 1, it indicates that there is content describing other user specific control information subsequently, and when the value is 0, it indicates that there is no content describing other user specific control information subsequently. |
| If the value of USCCH exist flag is 1, there are the following three fields: | |
| Resource Allocation | Time-frequency resource allocation used by the base station for sending user specific control information |

TABLE 2-continued

| Name of Field | Description |
|---|---|
| Transmission Format | Modulation coding mode used by the base station for sending user specific control information |
| USCCH Exist Flag | Indicating whether there is content describing other user specific control information subsequently; when the value is 1, it indicates that there is content describing other user specific control information subsequently, and when the value is 0, it indicates that there is no content describing other user specific control information subsequently. |
| . . . | |

Embodiment 2

In this embodiment, the first subframe SF 0 includes the user specific control information, the non-user-specific control information is sent by segment, the time-frequency resource allocation and the modulation coding mode which are used to send the first non-user-specific control information segment are invariable and known to the terminal.

As shown in FIG. 4(*b*), in SF 0, the base station sends the first non-user-specific control information segment in the time-frequency resource allocation of the first subframe known to the terminal according to the modulation coding mode known to the terminal, the sent non-user-specific control information segment includes content such as: the time-frequency resource allocation used by the base station for sending the user specific control information, the modulation coding mode used by the base station for sending the user specific control information, and the flag indicating whether the current subframe includes other non-user-specific control information segment.

The terminal decodes and obtains the first non-user-specific control information segment in the known time-frequency resource allocation through corresponding modulation coding mode, thereby obtaining content such as: the downlink time-frequency resource allocation of the first piece of user specific control information, the modulation coding mode used by the base station for sending the first piece of user specific control information, and the information indicating whether the subframe includes other non-user-specific control information segment. When the subframe includes other non-user-specific control information segments, the terminal calculates the time-frequency resource allocation of the next non-user-specific control information segment through the information of the time-frequency resource used by the base station for sending the user specific control information. Wherein the information of the time-frequency resource includes the allocation and the size of the time-frequency resource.

The first non-user-specific control information segment sent by the base station to the terminal can be described in the form in Table 3.

TABLE 3

| Name of Field | Description |
|---|---|
| Resource Allocation | Time-frequency resource allocation used by the base station for sending user specific control information |
| Transmission Format | Modulation coding mode used by the base station for sending user specific control information |

TABLE 3-continued

| Name of Field | Description |
|---|---|
| NUSCCH Exist Flag | Indicating whether there is subsequent non-user-specific control information segment in the current subframe; when the value is 1, it indicates that there is subsequent non-user-specific control information segment, and when the value is 0, it indicates that there is no subsequent non-user-specific control information segment. |
| . . . | |

Embodiment 3

In this embodiment, the first subframe SF 0 includes the user specific control information, all the non-user-specific control information is sent together, and the time-frequency resource allocation used to send the non-user-specific control information is not invariable, so it is required to send the resource allocation information of the non-user-specific control information in SF 0.

As shown in FIG. 4(c), in SF 0, the base station sends the information describing the time-frequency resource allocation used by the base station for sending the non-user-specific control information in the time-frequency resource allocation of the first subframe known to the terminal according to the modulation coding mode known to the terminal, namely the base station sends the resource allocation information of the non-user-specific control information; after obtaining the information, the terminal can know the time-frequency resource allocation used by the base station for sending the non-user-specific control information, and can decode and obtain the non-user-specific control information in the obtained time-frequency resource allocation. The non-user-specific control information includes content such as: the time-frequency resource allocation used by the base station for sending the user specific control information, the modulation coding mode used by the base station for sending the user specific control information, and the field describing whether the base station sends the user specific control information in each subframe of the downlink time period. Here, the time-frequency resource zone used by the base station for sending the resource allocation information of the non-user-specific control information is known to the terminal.

Then the terminal decodes and obtains the non-user-specific control information in the known time-frequency resource allocation through corresponding modulation coding mode, thereby obtaining content such as: the downlink time-frequency resource allocation of each piece of user specific control information, the modulation coding mode by the base station for sending each piece of user specific control information, and the information indicating whether the base station sends the user specific control information in each subframe of the downlink time period.

Here, the non-user-specific control information sent by the base station to the terminal can also be described in the forms in Table 1 or Table 2.

Embodiment 4

In this embodiment, the third subframe SF 2 includes the user specific control information, all the non-user-specific control information is sent together, the time-frequency resource allocation and the modulation coding mode which are used to send the non-user-specific control information are invariable and known to the terminal.

As shown in FIG. 5(a), in SF 2, the base station sends the non-user-specific control information in the time-frequency resource allocation of the third subframe known to the terminal according to the modulation coding mode known to the terminal, the sent non-user-specific control information includes content such as: the time-frequency resource allocation used by the base station for sending the user specific control information, and the modulation coding mode used by the base station for sending the user specific control information.

The terminal decodes and obtains the non-user-specific control information in the known time-frequency resource allocation through corresponding modulation coding mode, thereby obtaining content such as: the downlink time-frequency resource allocation of each piece of user specific control information, and the modulation coding mode used by the base station for sending each piece of user specific control information.

Here, the non-user-specific control information sent by the base station to the terminal can be described in the forms in Table 1 or Table 2.

Embodiment 5

In this embodiment, the third subframe SF 2 includes the user specific control information, the non-user-specific control information is sent by segment, the time-frequency resource allocation and the modulation coding mode which are used to send the first non-user-specific control information segment are invariable and known to the terminal.

As shown in FIG. 5(b), in SF 2, the base station sends the first non-user-specific control information segment in the time-frequency resource allocation of the third subframe known to the terminal according to the modulation coding mode known to the terminal, the sent non-user-specific control information segment includes content such as: the time-frequency resource allocation used by the base station for sending the user specific control information, the modulation coding mode used by the base station for sending the user specific control information, and the flag indicating whether the current subframe includes other non-user-specific control information segment.

The terminal decodes and obtains the first non-user-specific control information segment in the known time-frequency resource allocation through corresponding modulation coding mode, thereby obtaining content such as: the downlink time-frequency resource allocation of the first piece of user specific control information, the modulation coding mode used by the base station for sending the user specific control information, and the information indicating whether the subframe includes other non-user-specific control information segment. When the subframe includes other non-user-specific control information segment, the terminal calculates the time-frequency resource allocation of the next non-user-specific control information segment through the information of the time-frequency resource used by the base station for sending the user specific control information. Wherein the information of the time-frequency resource includes the allocation and the size of the time-frequency resource.

The first non-user-specific control information segment sent by the base station to the terminal can be described in the form in Table 3.

Embodiment 6

In this embodiment, the third subframe SF 2 includes the user specific control information, all the non-user-specific control information is sent together, and the time-frequency resource allocation used to send the non-user-specific control information is not invariable, so it is required to send the resource allocation information of the non-user-specific control information in SF 2.

Figure 5:
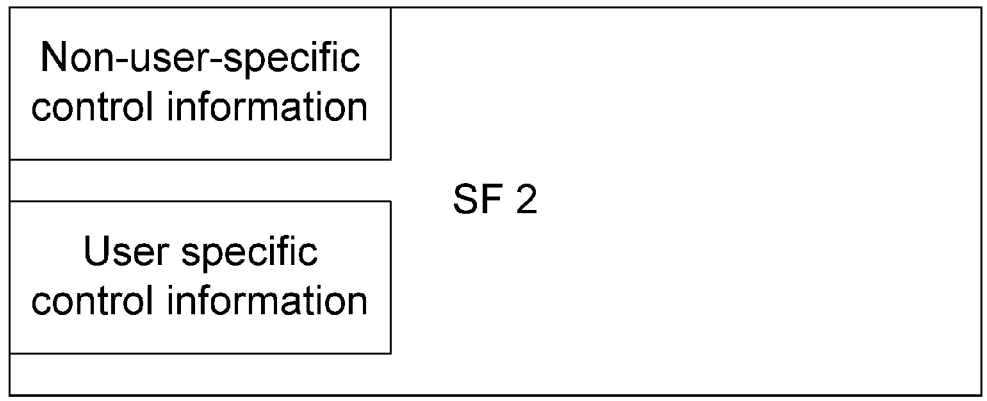
FIGS. 5(a)~(c) are schematic views of subframe structure for transmitting non-user-specific control information by a base station.
Figure 5:
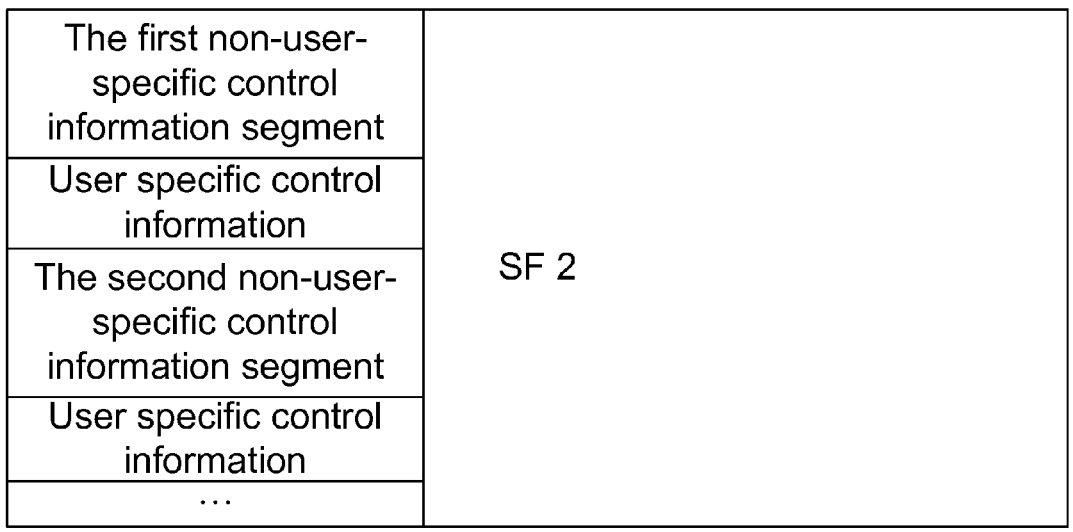
Figure 5:
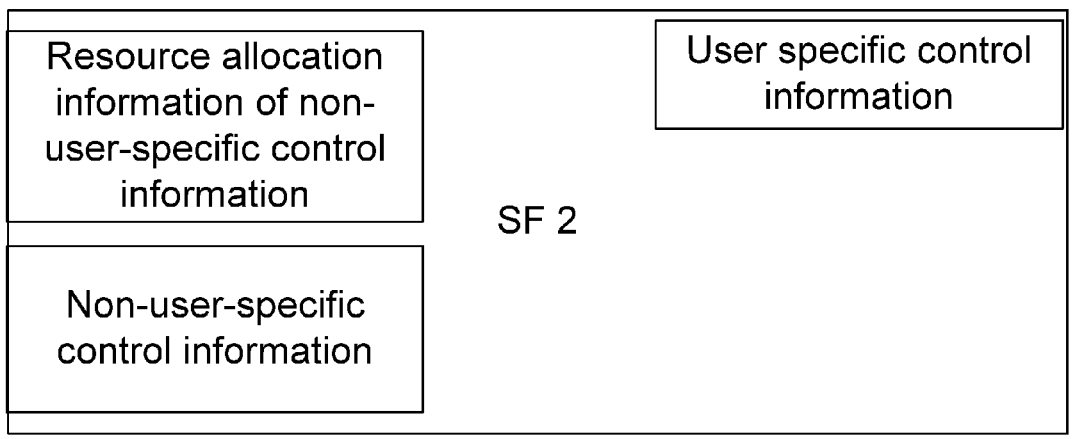

As shown in FIG. 5(*c*), in SF 2, the base station sends the information describing the time-frequency resource allocation used by the base station for sending the non-user-specific control information in the time-frequency resource allocation of the third subframe known to the terminal according to the modulation coding mode known to the terminal, namely the base station sends the resource allocation information of the non-user-specific control information; after obtaining the information, the terminal can know the time-frequency resource allocation used by the base station for sending the non-user-specific control information, and can decode and obtain the non-user-specific control information in the corresponding time-frequency resource allocation. The non-user-specific control information includes content such as: the time-frequency resource allocation used by the base station for sending the user specific control information, the modulation coding mode used by the base station for sending the user specific control information.

Then the terminal decodes and obtains the non-user-specific control information in the known time-frequency resource allocation through corresponding modulation coding mode, thereby obtaining content such as: the downlink time-frequency resource allocation of each piece of user specific control information, and the modulation coding mode used by the base station for sending each piece of user specific control information.

Here, the non-user-specific control information sent by the base station to the terminal can also be described in the forms in Table 1 or Table 2.

The above description is only preferred embodiments of the disclosure and is not used for restricting the protection scope of the disclosure; any modifications, equivalent replacements and improvements, etc. within the principle of the disclosure shall be included within the protection scope of the disclosure.

INDUSTRIAL APPLICABILITY

The method for transmitting non-user-specific control information in a wireless communication system in the present disclosure, includes: in a downlink time period which includes one or more time zones, a base station sends non-user-specific control information to a terminal in a time zone in which user specific control information is sent, so that the terminal can obtain information needed to decode the user specific control information. Further, in a downlink time period which includes one or more time zones, the base station sends the non-user-specific control information in a first time zone in which the user specific control information is sent. In this manner, by sending the non-user-specific control information to a user in a reasonable location, the base station can not only help the user decode user specific control information, but also improve the performance of the entire wireless communication system.

In the present disclosure, the non-user-specific control information may be sent, by broadcasting, multicasting or unicasting; partial or complete information needed to decode user specific control information may be sent according to practical condition; according to need, the non-user-specific control information may include time-frequency resource allocation used, modulation coding mode used, information indicating whether user specific control information is sent in each time zone of the downlink time period, and time interval at which user specific control information appear in time zones. In a word, the disclosure is flexible and variable in specific realization, is easy to realize, can be suitable for various situations and environments, and can be used in a wide range.

The invention claimed is:

1. A method for transmitting non-user-specific control information in a wireless communication system, comprising:

in a downlink time period which includes one or more time zones, a base station sends non-user-specific control information through broadcasting, multicasting or unicasting in a time zone in which user specific control information is sent; and a terminal obtains and decodes the non-user-specific control information, and then obtains information needed to decode user specific control information according to the obtained non-user-specific control information; wherein, the base station also sends time-frequency resource allocation information of the non-user-specific control information in the time zone in which the non-user-specific control information is sent;

correspondingly, according to the time-frequency resource allocation information of the non-user-specific control information, the terminal obtains time-frequency resource allocation used for sending the non-user-specific control information, and then decodes and obtains the non-user-specific control information in the obtained time-frequency resource allocation.

2. The transmitting method according to claim 1, wherein one time zone is a subframe.

3. The transmitting method according to claim 2, wherein the non-user-specific control information includes: time-frequency resource allocation used for user specific control information, and/or modulation coding mode used for user specific control information.

4. The transmitting method according to claim 2, wherein the non-user-specific control information is sent by segment, so that each non-user-specific control information segment includes information needed to decode a piece of user specific control information.

5. The transmitting method according to claim 4, wherein the non-user-specific control information segment includes: time-frequency resource allocation used by the base station for sending user specific control information, and/or modulation coding mode used by the base station for sending user specific control information, and/or a flag indicating whether other non-user-specific control information segment is sent in the current time zone.

6. The transmitting method according to claim 1, wherein the non-user-specific control information includes: time-frequency resource allocation used for user specific control information, and/or modulation coding mode used for user specific control information.

7. The transmitting method according to claim 1, wherein the non-user-specific control information is sent by segment, so that each non-user-specific control information segment includes information needed to decode a piece of user specific control information.

8. The transmitting method according to claim 7, wherein the non-user-specific control information segment includes: time-frequency resource allocation used by the base station for sending user specific control information, and/or modulation coding mode used by the base station for sending user specific control information, and/or a flag indicating whether other non-user-specific control information segment is sent in the current time zone.

9. A method for transmitting non-user-specific control information in a wireless communication system, comprising:

in a downlink time period which includes one or more time zones, a base station sends non-user-specific control information through broadcasting, multicasting or unicasting in a first time zone in which user specific control information is sent; and a terminal obtains and decodes the non-user-specific control information, and then obtains information needed to decode user specific control information according to the obtained non-user-specific control information;

wherein, the base station sends resource allocation information of the non-user-specific control information in the first time zone in which the non-user-specific control information is sent;

correspondingly, according to the resource allocation information of the non-user-specific control information, the terminal obtains time-frequency resource allocation used for sending the non-user-specific control information, and then decodes and obtains the non-user-specific control information in the obtained time-frequency resource allocation.

10. The transmitting method according to claim 9, wherein one time zone is a subframe, and the first time zone is a first subframe.

11. The transmitting method according to claim 10, wherein the non-user-specific control information includes: time-frequency resource allocation used for user specific control information, and/or modulation coding mode used for user specific control information, and/or information describing whether there is user specific control information in each time zone of the downlink time period.

12. The transmitting method according to claim 11, wherein there is user specific control information is in some of the time zones of the downlink time period, the non-user-specific control information further includes information indicating time interval at which user specific control information appears, and the time interval adopts one or more time zones as a unit.

13. The transmitting method according to claim 10, wherein the non-user-specific control information is sent by segment, so that each non-user-specific control information segment includes information needed to decode a piece of user specific control information.

14. The transmitting method according to claim 13, wherein time-frequency resource allocation of a first non-user-specific control information segment is known to the terminal, and time-frequency resource allocation of other non-user-specific control information segments can be obtained by the terminal through calculation.

15. The transmitting method according to claim 14, wherein the non-user-specific control information segment includes: time-frequency resource allocation used by the base station for sending user specific control information, and/or modulation coding mode used by the base station for sending user specific control information, and/or a flag indicating whether other non-user-specific control information segment is sent in the current time zone.

16. The transmitting method according to claim 15, wherein the first non-user-specific control information segment further includes: information indicating time interval at which user specific control information appears in time zones of the downlink time period; and time interval indicating information is carried explicitly or implicitly.

17. The transmitting method according to claim 9, wherein the non-user-specific control information includes: time-frequency resource allocation used for user specific control information, and/or modulation coding mode used for user specific control information, and/or information describing whether there is user specific control information in each time zone of the downlink time period.

18. The transmitting method according to claim 17, wherein when there is user specific control information is in some of the time zones of the downlink time period, the non-user-specific control information further includes information indicating time interval at which user specific control information appears, and the time interval adopts one or more time zones as a unit.

19. The transmitting method according to claim 9, wherein the non-user-specific control information is sent by segment, so that each non-user-specific control information segment includes information needed to decode a piece of user specific control information.

20. The transmitting method according to claim 19, wherein time-frequency resource allocation of a first non-user-specific control information segment is known to the terminal, and time-frequency resource allocation of other non-user-specific control information segments can be obtained by the terminal through calculation.

21. The transmitting method according to claim 20, wherein the non-user-specific control information segment includes: time-frequency resource allocation used by the base station for sending user specific control information, and/or modulation coding mode used by the base station for sending user specific control information, and/or a flag indicating whether other non-user-specific control information segment is sent in the current time zone.

22. The transmitting method according to claim 21, wherein the first non-user-specific control information segment further includes: information indicating time interval at which user specific control information appears in time zones of the downlink time period; and time interval indicating information is carried explicitly or implicitly.

* * * * *